(12) United States Patent
Chen et al.

(10) Patent No.: US 7,236,315 B2
(45) Date of Patent: Jun. 26, 2007

(54) COMPACT LENS SYSTEM

(75) Inventors: Chun-Hong Chen, Taichung (TW); Shu-Hung Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/239,086

(22) Filed: Sep. 30, 2005

(65) Prior Publication Data

US 2006/0221467 A1  Oct. 5, 2006

(30) Foreign Application Priority Data

Apr. 1, 2005 (TW) ............................. 94110654 A

(51) Int. Cl.
*G02B 9/04* (2006.01)
*G02B 3/12* (2006.01)
(52) U.S. Cl. .................. 359/795; 359/717; 359/793
(58) Field of Classification Search ............. 359/717, 359/793, 795
See application file for complete search history.

(56) References Cited

U.S. PATENT DOCUMENTS

| | | |
|---|---|---|
| 4,212,517 A | 7/1980 | Fujii |
| 4,364,643 A | 12/1982 | Momiyama |
| 4,390,252 A | 6/1983 | Mori |
| 4,396,255 A | 8/1983 | Imai |
| 4,426,137 A | 1/1984 | Mori |
| 4,443,070 A | 4/1984 | Fujioka |
| 4,448,497 A | 5/1984 | Wakamiya |
| 6,031,670 A | 2/2000 | Inoue |
| 6,441,971 B2 | 8/2002 | Ning |
| 6,992,841 B2 * | 1/2006 | Saito et al. .................. 359/794 |

* cited by examiner

*Primary Examiner*—Loha Ben
*Assistant Examiner*—Jack Dinh
(74) *Attorney, Agent, or Firm*—Troxell Law Office, PLLC

(57) ABSTRACT

A compact lens system includes a first positive lens element (1) on the object side and a second negative lens element (2) on the image side. The first positive lens element is a meniscus lens having a convex surface (11) facing the object side. The second negative lens element is also a meniscus lens having a convex surface (12) facing the image side. Both of the first and second lens elements are aspheric lenses each having at least one aspheric surface. The first and second lens elements are made of different plastic materials and are symmetrically arranged with respect to each other along the optical axis.

12 Claims, 2 Drawing Sheets

COMPACT LENS SYSTEM

BACKGROUND OF THE INVENTION

1. Field of the Invention

The present invention relates to a lens system, and particularly relates to a compact lens system with low cost and high performance for use in a compact photographic device such as a camera phone and a compact digital camera.

2. Description of Prior Art

Portable photographic devices, such as camera phones, compact digital cameras and personal digital assistances (PDAs), generally require its lens to be compact and low cost while maintaining a high level of optical performance. Due to the limited space, photographing lenses for the portable photographic devices have dimensions much smaller than those for common photographic cameras and video cameras. Accordingly, camera phones and compact digital cameras generally employ fixed focal length lenses.

As there is a large selection of glass available with different indices of refraction and dispersion properties, glass is generally used for photographing lenses. Glass lenses are manufactured by a grinding and polishing process, which is more expensive and hard to duplicate in mass manufacturing compared to plastic lenses. This process also makes it difficult and expensive to fabricate a lens with any other shape than spherical or planar. Further, spherical surface lenses have difficulty in correcting distortion in ultra-wide angle lenses or coma in large-aperture lenses brought about by spherical aberration. Accordingly, to address this problem, an aspheric lens is used. The aspheric lens may be a plastic lens formed by plastic molding or a glass lens formed by glass molding.

In the current market, most lens systems for compact photographic devices such as camera phones are generally composed of two plastic lens elements, or of one glass lens element and two plastic lens elements (referring to U.S. Pat. No. 6,441,971). The two plastic lens elements in those conventional lens systems are generally configured as positive lens elements that are asymmetrically arranged. This renders the lens system more sensitive to temperature variations and requires a high level of precision, which limits its extensive application. Also, aberrations cannot be effectively corrected, which significantly degrades the optical performance of the lens system. In addition, the two plastic lens elements are generally made of the same plastic material or of different plastic materials with similar refractive indices, which makes the correction of field curvature difficult. Further, the aspheric lens element employed in those conventional lens systems generally has a steep surface topography with varying radius of curvature, which makes the manufacture of the aspheric lens element difficult.

U.S. Pat. No. 6,031,670 discloses a lens system composed of two plastic lens elements, one of which is a negative meniscus lens element on the object side and the other is a positive biconvex lens element on the image side. Both of the two plastic lens elements are formed as aspheric lenses for aberration correction. However, the two aspheric lens elements are asymmetrically arranged. As a result, distortions of the optical system cannot be eliminated completely. In addition, the two plastic lens elements are made of the same material having the same refractive indices. Restriction to only one lens material makes it difficult to reduce the Petzval sum and thus image field curvature. The Petzval sum is the sum when the inverse of the product of the index of refraction and focal length of each lens element is added to the total number of lens elements making up the lens system.

U.S. Pat. No. 4,212,517 discloses a lens system of a modified Gauss type having the aperture stop between lens elements. This symmetry design of the lens elements allows well-balanced correction of all types of aberrations. However, this lens system is composed of six lenses. Consequently, the overall length of this lens system is increased, which deviates from the current trend for compactness. Various symmetry arrangements of lens elements are also disclosed in U.S. Pat. Nos. 4,364,643; 4,390,252; 4,396,255; 4,426,137; 4,443,070 and 4,448,497. However, these lens systems as disclosed also have the same problem of a large number of lens elements, and thus are not suitable for use in compact photographic devices.

Accordingly, a compact lens system for use in a compact photographic device is desired to overcome the above disadvantages present in the prior art.

SUMMARY OF THE INVENTION

One object of the present invention is to provide a compact lens system that has only two component lens elements for use in a portable photographic device.

Another object of the present invention is to provide a compact lens system that can be easily manufactured at a low cost while offering a high level of optical performance.

To achieve the above objects of the present invention, a compact lens system in accordance with the present invention includes a first positive lens element on the object side and a second negative lens element on the image side. The first positive lens element is a meniscus lens having a convex surface facing the object side. The second negative lens element is also a meniscus lens having a convex surface facing the image side. Both of the first and second lens elements are aspheric lenses each having at least one aspheric surface. The first and second lens elements are made of different plastic materials and are symmetrically arranged with respect to each other along the optical axis.

The above compact lens system satisfies the following conditional expression:

$$3.2 < \frac{-f_2}{f_1} < 3.6$$

where, $f_1$ and $f_2$ represent the focal lengths of the first and second lens elements, respectively.

In a preferred embodiment of the present invention, the first lens element is made of amorphous Polyolefin, and the second lens element is made of Polycarbonate.

The aspheric surfaces of the first and second lens elements are expressed by the following equation:

$$Z = \frac{cH^2}{1 + [1 - (K+1)c^2H^2]^{1/2}} + AH^4 + BH^6 + CH^8 + DH^{10}$$

BRIEF DESCRIPTION OF THE DRAWINGS

The present invention may best be understood through the following description with reference to the accompanying drawings, in which.

DETAILED DESCRIPTION OF THE INVENTION

Figure 1:
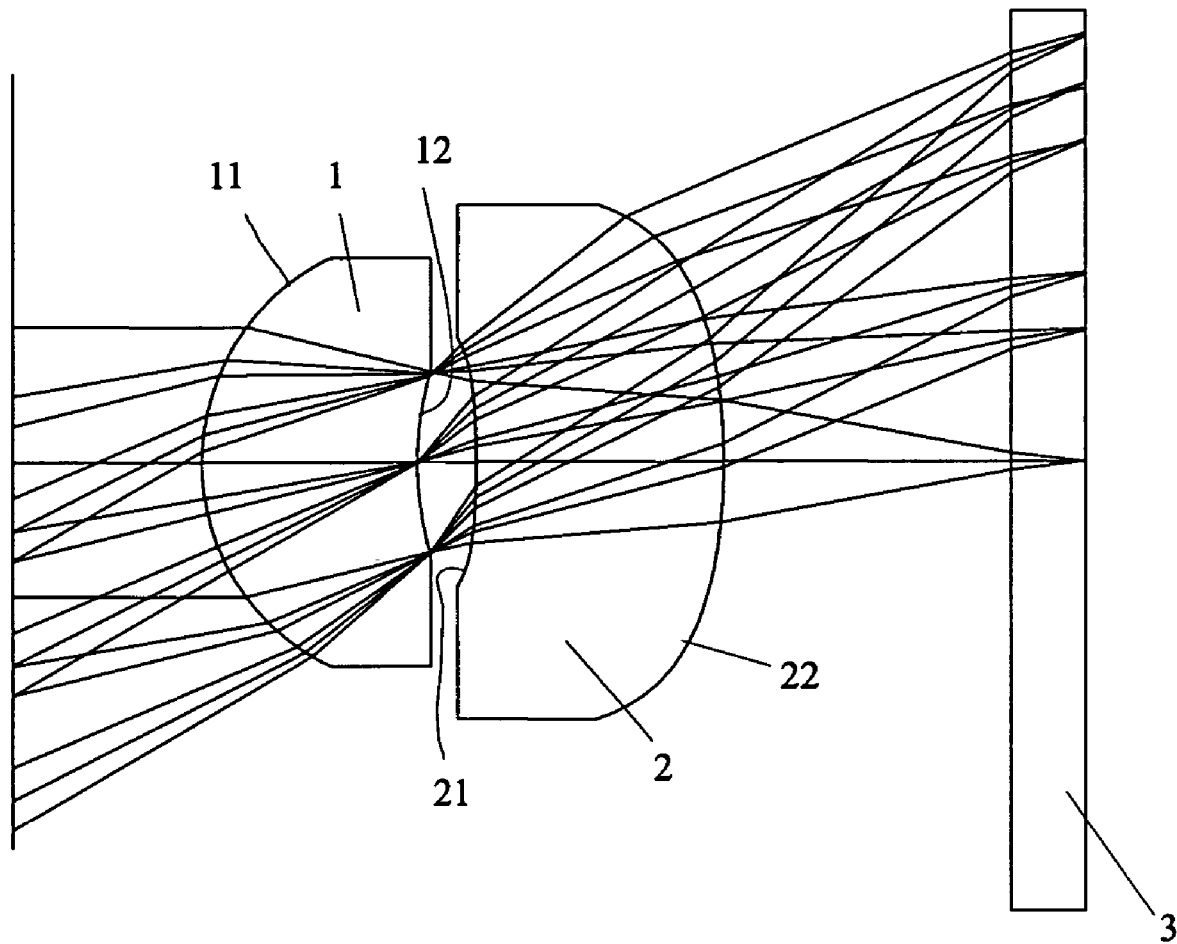
FIG. 1 is an optical cross-sectional view of a compact lens system in accordance with the present invention.

Referring to FIG. 1, a compact lens system for a portable photographic device in accordance with the present invention includes a first positive lens element 1 on the object side, a second negative lens element 2 disposed on the image side and defining an optical axis with the first positive lens element 1, and a cover glass 3 on which an image pickup device such as a CCD (Charge-Coupled Device) sensor or CMOS (Complimentary Metal-Oxide Semiconductor) sensor is to be disposed. The first lens element 1 is in the form of a meniscus lens having a convex surface 11 facing the object side and an opposite concave surface 12 on the image side. At least one of the surfaces 11, 12 is an aspheric surface. The second lens element 2 is also in the form of a meniscus lens having a convex surface 22 facing the image side and an opposite concave surface 21 on the object side. At least one of the surfaces 21, 22 are made aspheric. Accordingly, the first and second lens elements 1, 2 are arranged in a face-to-face manner and are symmetrical with respect to each other along the optical axis. This symmetry design of the lens elements allows well-balanced correction of various aberrations.

The present compact lens system satisfies the following conditional expression to facilitate mass production:

$$3.2 < \frac{-f_2}{f_1} < 3.6$$

where, $f_1$ and $f_2$ represent the focal lengths of the first and second lens elements, respectively.

Both of the first and second lens elements 1, 2 are aspheric lenses each having at least one aspheric surface. Therefore, aberrations can be reduced. Specifically, distortion in ultra-wide angle lenses or coma in large-aperture lenses brought about by spherical aberration, which is difficult for a spherical lens to correct, can be well corrected. Further, a significantly reduced overall length of the lens system is also ensured compared with a conventional lens system composed of a large number of spherical lens elements. The aspheric surfaces of the first and second lens elements 1, 2 are expressed by the following equation:

$$Z = \frac{cH^2}{1 + [1-(K+1)c^2H^2]^{1/2}} + AH^4 + BH^6 + CH^8 + DH^{10}$$

Where:
Z is Sag value along the optical axis;
c is the base curvature (1/radius) of the surface;
H is the semi-diameter height;
K is the conic coefficient; and
A, B, C and D are the 4th-order, 6th-order, 8th-order and 10th-order aspheric coefficients, respectively.

In a preferred embodiment of the present invention, the first lens element 1 is made of amorphous Polyolefin having a refractive index of 1.466 and an Abbe number of 61. The amorphous Polyolefin employed in the present invention is preferably that sold under the trade name "Zeonex" (from Nippon Zeon Company Co. Ltd., Tokyo, Japan). The second lens element 2 is preferably made of Polycarbonate having a refractive index of 1.584 and an Abbe number of 31.

Figure 2:
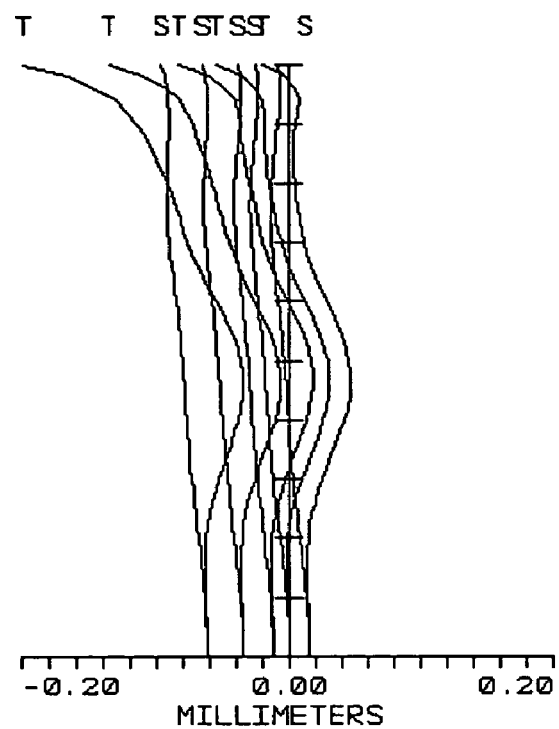
FIG. 2 shows a graph of field curvature of the present compact lens system.
Figure 3:
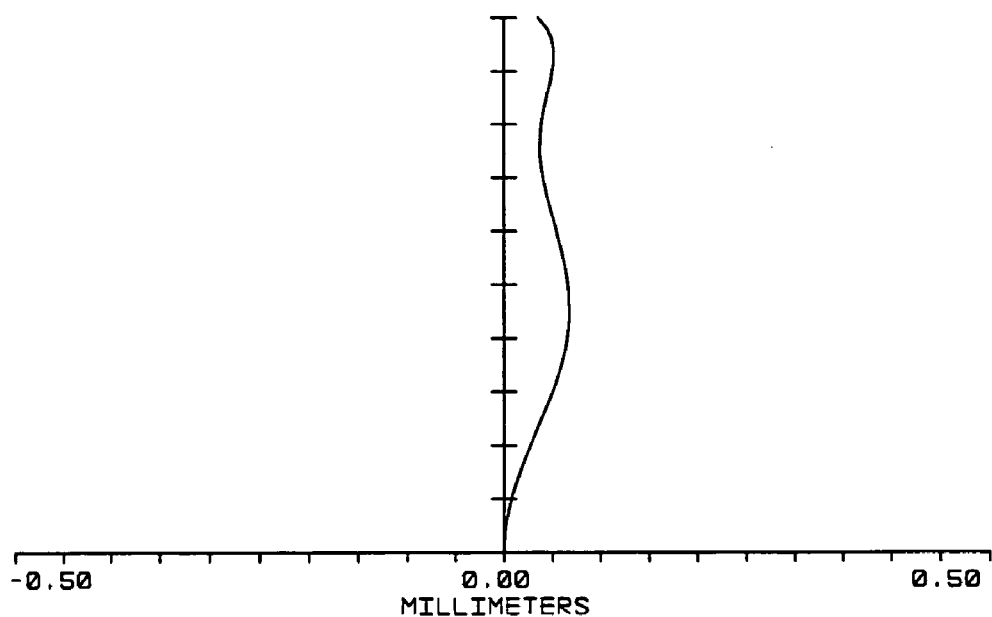
FIG. 3 shows a graph of spherical aberration of the present compact lens system.

As illustrated in FIGS. 2 and 3, the compact lens system according to the present invention provides a high level of optical performance while realizing a compact structure of only two component lens elements. By symmetrically arranging the positive meniscus lens element 1 and the negative meniscus lens element 2, the Petzval sum and other aberrations of the entire optical system are kept adequately low. The low Petzval sum minimizes field curvature and astigmatism. The selection of different materials having considerably different refractive indices for the positive and negative lens elements 1, 2 also contributes to the minimization of the Petzval sum. The second negative lens element 2 is made of Polycarbonate, which allows correction of chromatic aberrations. Both of the lens elements 1, 2 are formed as aspheric lenses to correct coma and spherical aberrations. The positive and negative configuration of the two plastic lens elements 1, 2 compensates for temperature variations, and thus the adverse effect of temperature variations to the optical performance of the lens system is reduced.

The present lens system can be manufactured at a low cost while maintaining a high level of optical performance. By constructing both of the component lens elements 1, 2 as symmetrically arranged plastic lenses, manufacture cost of the present lens system is significantly reduced since a high level of precision is thus not required. In addition, each of the aspheric surfaces of the lens elements 1, 2 is configured to have a gentle surface topography with a small number of varying radiuses of curvature, which facilitates the manufacture of the aspheric lens elements and thus further reduces cost.

In addition, as clearly shown in FIG. 1, the chief ray angle of the present lens system, which is a measurement of the maximum angle a ray that passes through the center of the lens can take and still reach the outer edge of the sensor, is larger than conventional designs. It is well known that, the larger the chief ray angle, the more light is processed, resulting in better picture quality. Accordingly, good image quality is ensured by the present invention.

It should be understood that, although the present invention is disclosed to have both of the component lens elements 1, 2 to be plastic lenses for cost reduction considerations, the lens elements 1, 2 may also be formed as glass lenses. In this case, the production cost is correspondingly increased.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A compact lens system comprising a first lens element on the object side and a second lens element on the image side, the first and second lens elements having opposite refractive power, the first lens element having a first convex surface facing the object side and an opposite first concave surface on the image side, at least one of the first convex and concave surfaces being aspheric, the second lens element having a second convex surface facing the image side and an opposite second concave surface on the object side, at least one of the second convex and concave surfaces being aspheric, said compact lens system having no more than two lens elements;

wherein, the first and second lens elements satisfy the following condition:

$$3.2 < \frac{-f_2}{f_1} < 3.6$$

where, $f_1$ represents the focal length of the first lens element, and $f_2$ represents the focal length of the second lens element.

2. The compact lens system as claimed in claim 1, wherein the first lens element has a positive refractive power and the second lens element has a negative refractive power.

3. The compact lens system as claimed in claim 1, wherein the concave surfaces of the first and second lens elements are arranged in a face-to-face manner.

4. The compact lens system as claimed in claim 1, wherein the first and second lens elements are made of different materials having different refractive indices.

5. The compact lens system as claimed in claim 4, wherein the first and second lens elements are made of different glass materials.

6. The compact lens system as claimed in claim 4, wherein the first and second lens elements are made of different plastic materials.

7. The compact lens system as claimed in claim 6, wherein one of the first and second lens elements is made of Polycarbonate.

8. The compact lens system as claimed in claim 7, wherein the other of the first and second lens elements is made of amorphous Polyolefin.

9. The compact lens system as claimed in claim 6, wherein the first lens element is made of amorphous Polyolefin and the second lens element is made of Polycarbonate.

10. The compact lens system as claimed in claim 1, wherein the aspheric surfaces of the first and second lens elements satisfy the following equation:

$$Z = \frac{cH^2}{1 + [1 - (K+1)c^2H^2]^{1/2}} + AH^4 + BH^6 + CH^8 + DH^{10}$$

where: Z is Sag value along the optical axis, c is the curvature (1/radius) of the surface, H is the semi-diameter height, K is the conic coefficient, and A, B, C and D are the 4th-order, 6th-order, 8th-order and 10th-order aspheric coefficients, respectively.

11. A compact lens system comprising:

a first positive lens element of a meniscus type disposed on the object side, the first positive lens element having a first convex surface facing the object side and an opposite first concave surface on the image side, at least one of the first convex and concave surfaces being aspheric; and a second negative lens element of a meniscus type disposed on the image side, the second negative lens element having a second convex surface facing the image side and an opposite second concave surface on the object side, at least one of the second convex and concave surfaces being aspheric; wherein the first and second lens elements are made of different materials having different refractive indices, said compact lens system has no more than two lens elements, and the first and second lens elements satisfy the following condition:

$$3.2 < \frac{-f_2}{f_1} < 3.6$$

where, $f_1$ represents the focal length of the first lens element, and $f_2$ represents the focal length of the second lens element.

12. The compact lens system as claimed in claim 11, wherein the first positive lens element is made of amorphous Polyolefin, and the second negative lens element is made of Polycarbonate.

* * * * *